(12) United States Patent
Azuma

(10) Patent No.: US 10,753,855 B2
(45) Date of Patent: Aug. 25, 2020

(54) CROSSCUT TEST DEVICE AND CROSSCUT METHOD

(71) Applicant: Yoichiro Azuma, Tochigi (JP)

(72) Inventor: Yoichiro Azuma, Tochigi (JP)

( * ) Notice: Subject to any disclaimer, the term of this patent is extended or adjusted under 35 U.S.C. 154(b) by 369 days.

(21) Appl. No.: 15/741,407

(22) PCT Filed: Jul. 4, 2016

(86) PCT No.: PCT/JP2016/070353
§ 371 (c)(1),
(2) Date: Sep. 18, 2018

(87) PCT Pub. No.: WO2017/007034
PCT Pub. Date: Jan. 12, 2017

(65) Prior Publication Data
US 2019/0025190 A1    Jan. 24, 2019

(30) Foreign Application Priority Data
Jul. 3, 2015    (JP) ................................ 2015-145298

(51) Int. Cl.
*G01N 19/04* (2006.01)
*B26D 5/08* (2006.01)

(52) U.S. Cl.
CPC ............. *G01N 19/04* (2013.01); *B26D 5/086* (2013.01); *G01N 2203/0053* (2013.01)

(58) Field of Classification Search
CPC ... G01N 19/04; G01N 2203/0053; B26D 5/08
USPC ...................................................... 73/150 A
See application file for complete search history.

(56) References Cited

U.S. PATENT DOCUMENTS

| 2012/0017442 A1* | 1/2012 | King | B26B 1/10 30/155 |
| 2016/0047736 A1* | 2/2016 | Liang | B26B 5/002 73/150 A |

\* cited by examiner

*Primary Examiner* — Tarun Sinha
(74) *Attorney, Agent, or Firm* — Taro Yaguchi

(57) ABSTRACT

There are provided a cross-cut test device and a cross-cut method capable of safely making incisions for testing the adhesion of a coating film at high-precision interval and depth under stable conditions using a simple operation. A cross-cut device, comprising: a plurality of blades respectively having an engagement hole; a fulcrum shaft for pivotably mounting thereon the blades parallel to each other and arranged in the blade thickness direction; and a blade holder for housing the blades pivotably mounted on the fulcrum shaft, wherein a magnet is interposed between the cutting edges and the coating film to be tested, and wherein the blades are pulled in the direction toward cutting edges by the magnetic force of the magnet.

4 Claims, 10 Drawing Sheets

CROSSCUT TEST DEVICE AND CROSSCUT METHOD

FIELD OF THE INVENTION

The present invention relates to a cross-cut test device and a cross-cut method for making incisions in a right angle lattice pattern through a coating film applied to a substrate in order to evaluate the resistance of the coating film to separation from the substrate.

BACKGROUND OF THE INVENTION

Techniques for evaluating the adhesion of a coating applied to a substrate include various test methods represented by, for example, JIS "K-5400." According to the JIS "K-5400" method, incisions are made in a coating on a test piece, wherein the incisions penetrate the coating to reach a substrate of the test piece. Based on the extended damages of the coating at the incisions, vulnerability and/or adhesion to the substrate for the coating are determined. Also, if necessary, the adhesive cellophane tape peel test is conducted using the technique specified by JIS "Z-1552" for the coating damages created as above to thereby quantify the adhesion.

Traditional cross-cut methods generally involve making a predetermined number of incisions according to a specific test method being employed through the coating film being tested using a utility knife and a cross cutting guide, subsequently turning the cross cutting guide by 90° and then, making another predetermined number of incisions along the guide so that the incisions are made in a right angle lattice pattern (e.g., see Patent Document 1).

In such a cross-cut method using the cross cutting guide, the blades need to be frequently exchanged. This is because the tip of the utility knife is prone to be damaged by frequently contacting with the cross cutting guide with a very narrow slits. Also, the cutting work has been extremely tedious in order to avoid making mistakes such as cutting the same location two or more times, and failing to make incisions where needed, thus there is a need to improve the cutting work.

Responding to the above problems, there have been proposed coating film cutting tools capable of making a plurality of incisions simultaneously using a plurality of cutting blades positioned with a predetermined interval in the blade thickness direction (e.g., Patent Documents 2-4). When making incisions simultaneously using such plurality of blades, it is very difficult to make those incisions while uniformly maintaining the biasing force of each blade against the coating film. In particular, for coatings with the film thickness less than 20 μm, making accurate evaluations have been difficult due to an insufficient or excessive incision depth.

As one method for solving such problems, the present inventor proposed a method for making a plurality of incisions simultaneously by utilizing the attractive force of a magnet provided on the side of the substrate opposite from the side of the coating film to thereby pull the plurality of blades towards their cutting edge and maintain the blade tips in contact with the coating film, and moving the contact point relative to the coating film while the blade tips are biased against the film (Patent Document 5). Since the attractive force of the magnet acts on all of the plurality of the blades, each of the blades may move independently in the blade width direction (up or down direction) to maintain the contact with the coating film along the shape of the film, allowing the blades to stably make a plurality of incisions even through coating films with 10 μm or less thickness.

SUMMARY OF THE INVENTION

The test device illustrated in Patent Document 5 had difficulties making a plurality of incisions through a coating film simultaneously and stably in the following cases:

(A) When a magnetic force from the other side of a substrate made of a soft magnetic material or the like does not work;

(B) When the thickness of the substrate is several millimeters or greater or when a test material to be tested is a thick solid object;

(C) When the substrate is made of an easy-to-sever material such as a resin film or the like, and therefore, incisions are made by a weak force in order not to sever the substrate; and (D) When the substrate has a curved surface such as that of a lens and the attractive force by a magnet is insufficient. Also, there were following challenges:

(E) An incision interval was prone to errors of 0.2 mm or greater at times; and (F) Blade change was cumbersome.

The present invention has been devised in order to solve the above problems.

The above challenges have been addressed by the following invention.

(1) A cross-cut device, comprising: a plurality of blades respectively having an engagement hole; a fulcrum shaft for pivotably mounting thereon the blades parallel to each other and arranged in a blade thickness direction; and a blade holder for housing the blades pivotably mounted on the fulcrum shaft, wherein a magnet is interposed between cutting edges of the blades and a coating film to be tested, and wherein the blades are pulled in the direction toward the cutting edges by a magnetic force of the magnet.

(2) Preferably, the blades each comprises a protrusion at least on one of side surfaces of the blade.

(3) The cross-cut test device preferably comprises a magnet roller for biasing the coating film to be tested.

(4) A cross-cut method for making a plurality of incisions through a coating film to be tested, said method comprising:

pivotably mounting a plurality of blades each with an engagement hole so that the plurality of blades are parallel to each other and arranged in a blade thickness direction inside a blade holder; and by an attractive force of a magnet interposed between cutting edges of the blades and the coating film, pulling each blade tip of the respective blades out of the blade holder, pushing the blade tips against the coating film, and moving the contact points between the blade tips and the coating film relative to the coating film.

The present invention provides a cross-cut test device and a cross-cut method capable of safely making incisions for testing the adhesion of a coating film at high-precision interval and depth under stable conditions using a simple operation; facilitating the blade exchange; and further, simultaneously making a plurality of incisions for testing the adhesion of a coating film even for a coating film applied on a curved substrate.

DETAILED DESCRIPTION OF THE INVENTION

Embodiments of the present invention will be described below in accordance with accompanying drawings.

Figure 1:
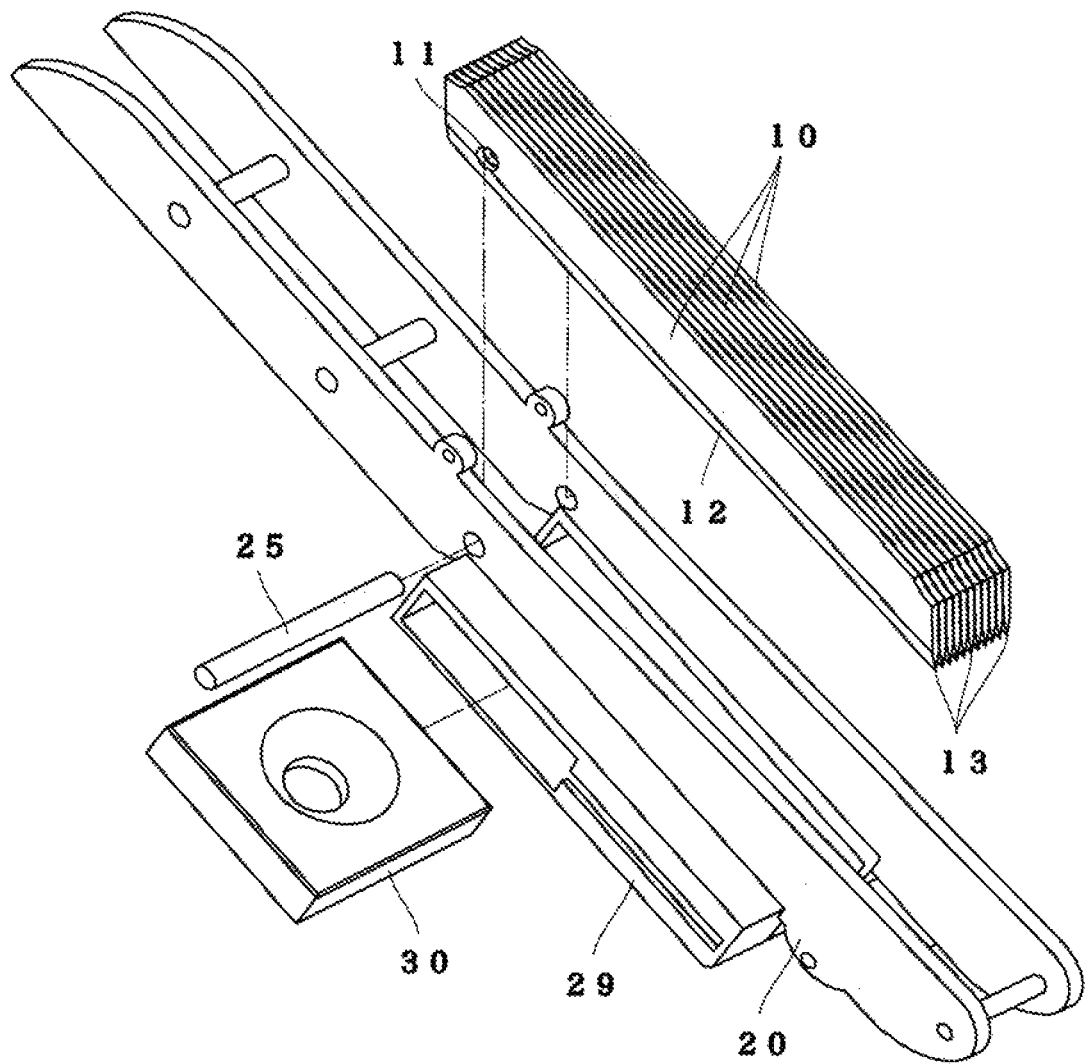
FIG. 1 is an exploded perspective view showing an example of a cross-cut test device of the present invention.
Figure 2:
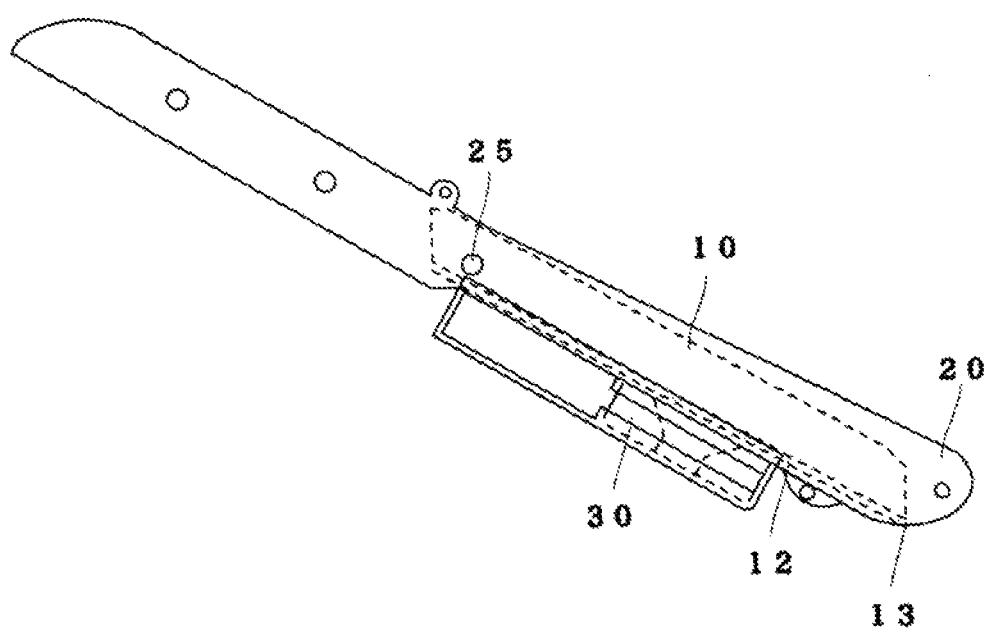
FIG. 2 is a transparent side view of the cross-cut test device shown in FIG. 1.

FIG. 1 is an example of exploded perspective view showing a basic structure of a cross-cut test device of the present invention; and FIG. 2 is a transparent side view of FIG. 1. In FIG. 1 and FIG. 2, eleven strip-shaped blades 10, each comprising an engagement hole 11 in its rear end in the longitudinal direction, are positioned with their respective cutting edges 12 facing down, wherein each engagement hole 11 is pivotably mounted on a fulcrum shaft 25 and housed in a blade holder. A magnet 30 for biasing the blades is disposed near the cutting edges 12 inside a magnet cover. The blade tips 13 of the blades 10 are pulled out of the blade holder 20 due to the attractive force of the magnet 30. The magnet 30 is preferably a magnet with a strong attractive force, and particularly, a rectangular neodymium magnet with a hole in its center and with an outer dimension of 20 mm-30 mm is preferable since it has small errors for the attractive forces applied to the eleven blades 60. With a cross-cut method using the cross-cut test device shown in FIG. 1, eleven incisions may be made simultaneously through a coating film being tested by pushing the blade holder 20 against the coating film so that the blade tips 13 are pushed into the coating film, and moving the contact points between the blade tips 13 and the coating film relative to the coating film while maintaining an 25-35° angle between the blades 10 and the coating film. Next, the coating film being tested is rotated by 90° and subsequently eleven incisions are made through the coating film in a similar manner to the previous cutting operation to thereby create incisions in a right angle lattice pattern with 100 cells or squares therein.

The cross-cut incision depth may be adjusted by the magnetic force of the magnet 30 as well as a distance from the fulcrum shaft 25 to the magnet 30. When considering the fulcrum shaft 11 as a fulcrum, the cutting edge 12 proximal to the magnet 30 as a point of effort application, and the blade tip 13 as a point of action, the counteraction force generated at the blade tip 13 when the blade tip 13 is pushed against the coating film decreases when the magnet 30 is closer to the fulcrum shaft 25 and increases when the magnet 30 is closer to the blade tip according to the principle of leverage. As a method for adjusting so that the cross-cut incisions reach the substrate of the coating film to be tested without severing the supporting substrate, the position of the magnet 30 is slid towards the blade tips when the incisions are too shallow, and slid towards the fulcrum shaft 25 when the incisions are too deep. The magnet cover 29 is detachably attached to the blade holder 20. The magnet 30 is capable of maintaining its position within the magnet cover 29 by the magnetic pulling force between the magnet 30 and the blades 10, but may be affixed within the magnet cover by fixing means such as a bolt.

The eleven blades 10 may move independently of each other. In order to decrease variability of the incision depth, the smaller the friction resistance forces, the better at contact points on the sides of the blades 10. The friction coefficient at each of contact points with the sides of blades 10 is preferably 0.6 or less, and more preferably, 0.3 or less when the blades 10 are magnetized by the magnetic field of the magnet 30. Methods for reducing the friction resistance forces at contact points on the sides of blades 10 include metal plating, sputtering, resin coating, DLC coating, etc. and these methods may be also combined. Also, in order to prevent the incision depth variability caused by the side surfaces of the two outer magnetized blades 10 attaching to the respective inner surfaces of the blade holder 20, the material of the blade holder 20 where it is in contact with the blades 10 is preferably made of a non-magnetic material.

The thickness of the blades 10 affects the pressure applied to the blades' side surfaces and the precision of the incision intervals. Preferably, the thickness of the blades 10 used in the cross-cut test is 85-95% of a specified incision interval in order to achieve small variability for the pressure applied to the blade tips and practical precision for the incision intervals. The blade tips 13 of the blades 10 are pushed against the coating film being tested by the attractive force of the magnet 30 provided proximal to the cutting edges 12. Accordingly, the blades 10 needs to comprise a soft magnetic material portion at least within a range where the attractive force of the magnet 30 is effective. With a structure providing enough attractive force of the magnet, the cutting edge and blade tip portions may be constituted with non-magnetic materials such as zirconia, silicon carbide, aluminum oxide, and diamond and the like.

Figure 3:
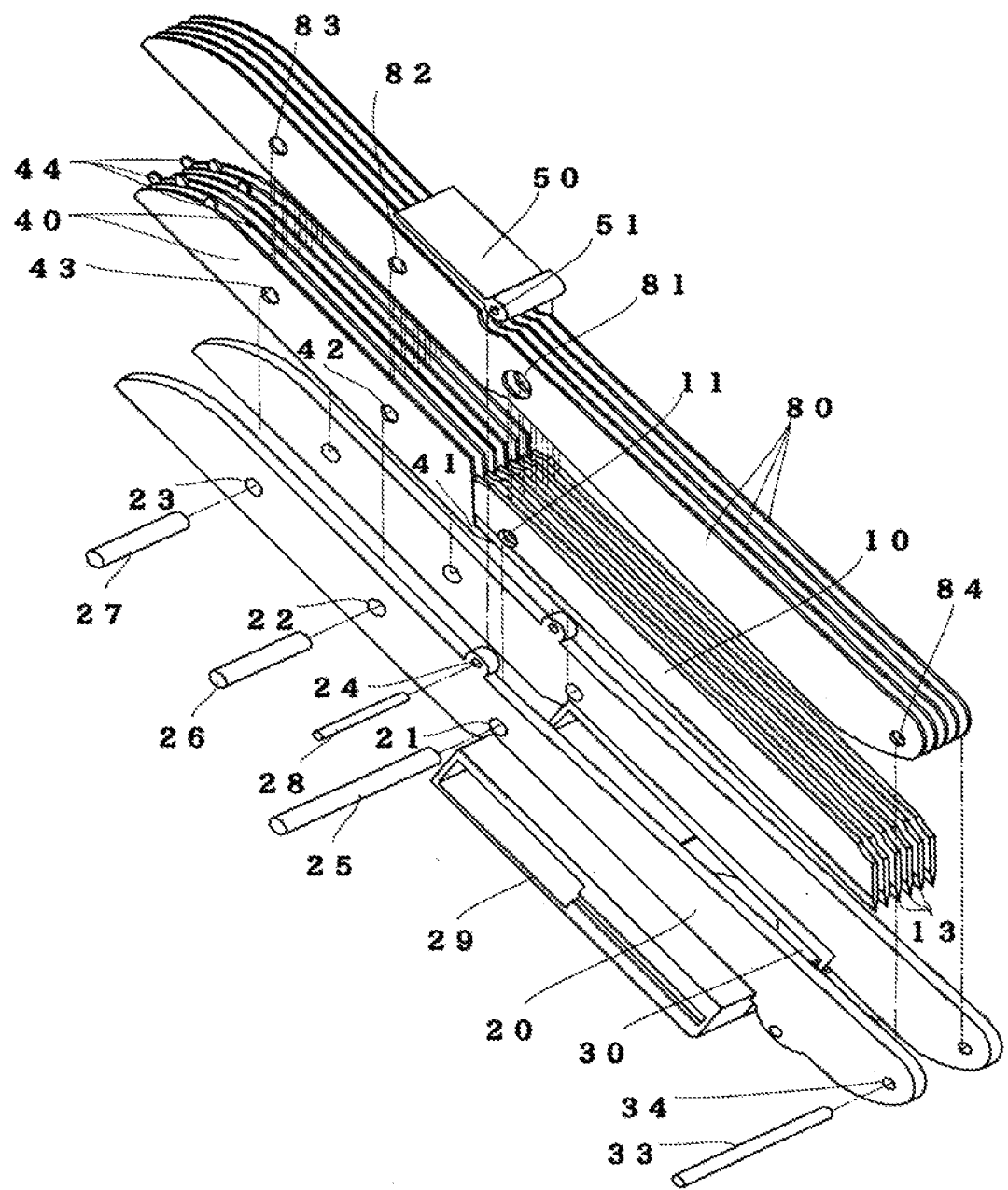
FIG. 3 is an exploded perspective view showing an example of a cross-cut test device comprising spacer plates used for the present invention.

FIG. 3 is an exploded perspective view showing one example of a cross-cut test device capable of making incisions in a right angle lattice pattern with 25 cells within using the blade holder 20 shown in FIG. 1. The cross-cut test device shown in FIG. 3 comprises a blade stopper 50 for fixing the blade tips 13 within the blade holder and a pickup plates 40 for facilitating picking up any of the blades 10. The blades 10 and spacer plates 80 are alternately positioned and the engagement hole 11 and an engagement hole 81 are pivotably mounted on the fulcrum shaft 25. Further, locking holes 82, 83, 84 of the spacer plates 80 are pivotably mounted on a pickup plate fulcrum shaft 26, a locking shaft 27, a locking shaft 33, respectively.

The friction coefficient between the side surfaces of the spacer plates 80 and the side surfaces of the blades is preferably the smallest possible, and particularly, the friction coefficient is preferably 0.6 or less when the blades 10 are magnetized by the magnet 30. With the friction coefficient 0.6 or less, the incision depth error among the blades will be reduced. More preferably, the friction coefficient is 0.3 or less. Methods for reducing the friction coefficient include metal vapor deposition, plating processing, resin coating and the like, and particularly, PTFE coating is preferred. The thickness and the number of the spacer plates 80 may be selected according to the incision interval or the blade thickness.

The blade stopper 50 is pivotably mounted on a locking shaft 28 of the blade holder 20. When the blade stopper 50 is rotated about the locking shaft 28 in the direction towards the cutting edges, the top rear ends of the blades 10 are pushed down by a cam and the blade tips 13 are lifted with the fulcrum shaft 25 as a fulcrum based on the principle of leverage to thereby fix the blades 10 within the blade holder 20. In the method using the cross-cut test device of FIG. 3, the blades 10 are fixed within the blade holder 20 with its angle relative to the coating film to be tested maintained at 25-35°, and the tips of the blade holder 20 is pushed against the coating film. Next, when the blade stopper 50 is slowly rotated, the fixed blades 10 are released and the blade tips 13 will come into contact with the coating film. Then, by moving the contact points with the coating film relative to the coating film while preventing the blade holder 20 from being lifted, six incisions are made simultaneously in the coating film. The coating film is then rotated by 90° and a similar operation is performed perpendicular to the six incisions previously made, generating 25 cells in the incision lattice. Similarly to the cross-cut test device of FIG. 1, the cross-cut incision depth is adjusted by the magnetic force and the position of the magnet 30.

The pickup plates 40 are disposed near the rear ends of the blades 10. According to the gap dimension between the pickup plates 40 and the rear ends of the blades 10, the degree of freedom of the rotation angle of the blades 10 is restricted and the amount that the blades 10 are pulled out of the blade holder 20 is adjusted. Also, the blades 10 that are no longer capable of making adequate incisions due to abrasive wear, damages or the like may be easily exchanged using the corresponding pickup plate 40. Specifically, by removing the fulcrum shaft 25 and the locking shaft 27 and pushing down a tab 44 of the pickup plate 40 corresponding to the blade 10 to be exchanged, a pawl 41 of the pickup plate will lift the rear end of the blade 10 with the pickup plate fulcrum shaft 26 as a fulcrum, allowing the blade 10 to be picked up. Further, by shifting the position of the tab 44 of an adjacent pickup plate, the blade 10 to be exchanged may be easily picked up.

Figure 4:
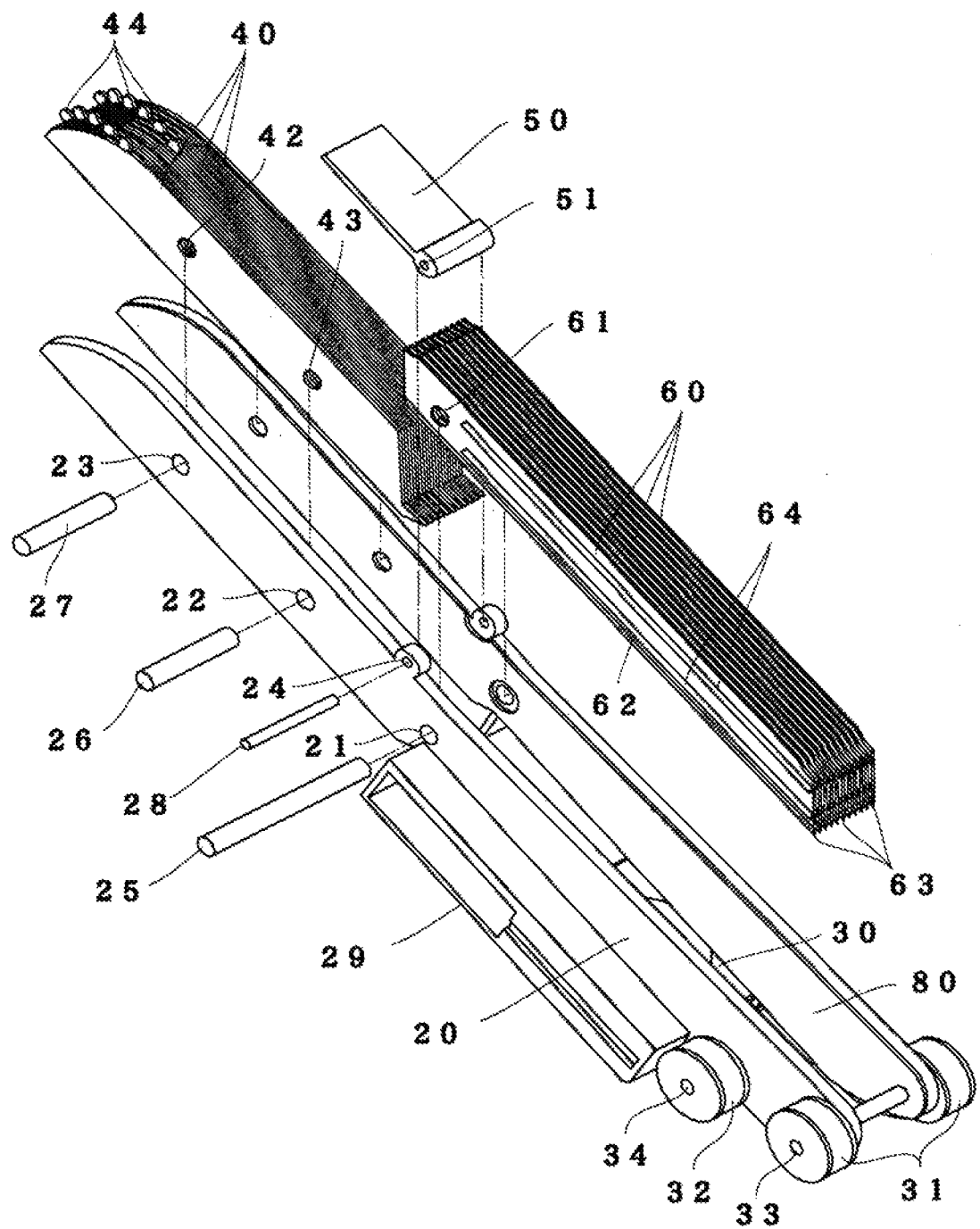
FIG. 4 is a exploded perspective view showing an example of a cross-cut test device comprising blades, each comprising protrusions on one of its side surfaces, and wheel-shaped magnets according to the present invention.
Figure 5:
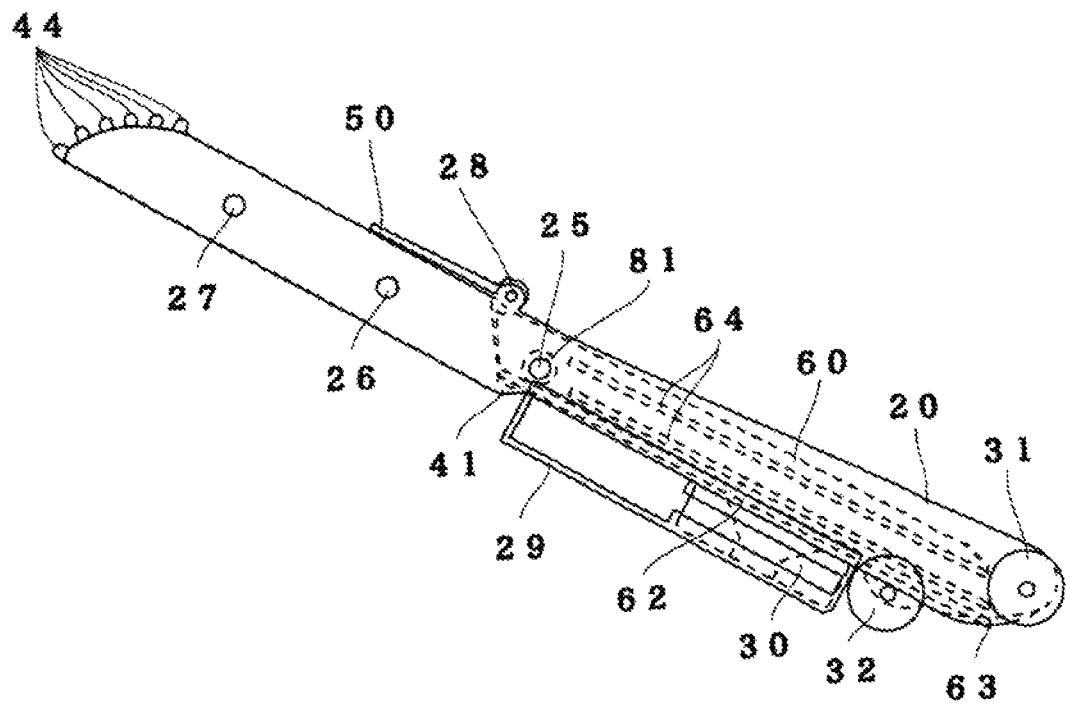
FIG. 5 is a transparent side view of the cross-cut test device shown in FIG. 4.
Figure 6:
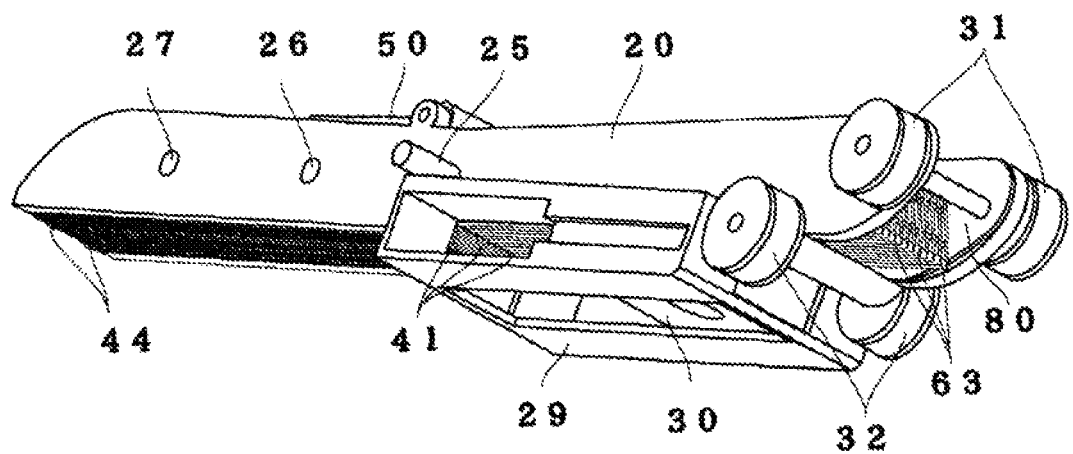
FIG. 6 is a bottom perspective view of the cross-cut test device shown in FIG. 4.
Figure 12:
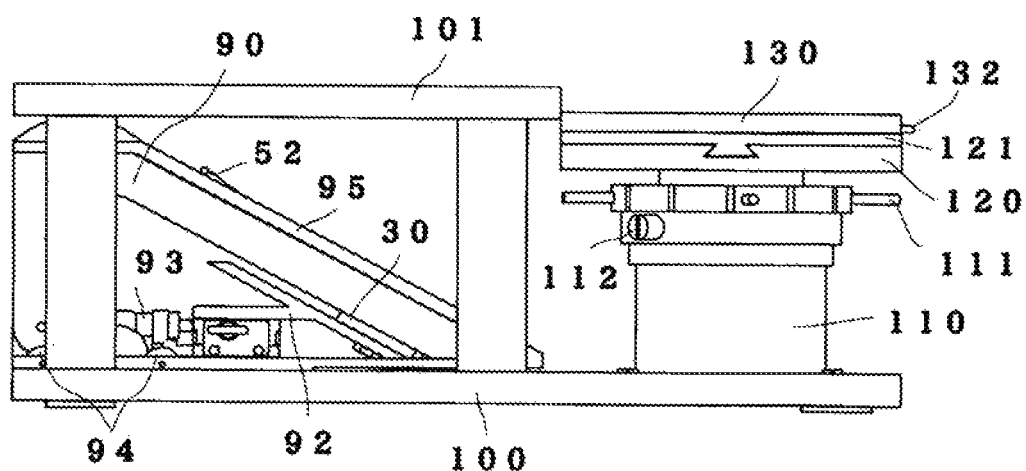
FIG. 12 is a side view of the cross-cut test device of FIG. 10 stowed in a test stand.

FIG. 4 is a exploded perspective view showing an example of a cross-cut test device provided with blades 60, each comprising semi-cylindrical protrusions 64 on one of its side surfaces. Also, FIG. 5 is a transparent side view of FIG. 4; and FIG. 6 is a bottom perspective view of FIG. 4. Further, FIG. 12 is an enlarged front view of a cross-cut test device of FIG. 4 making incisions into a spherical coating film to be tested. Since the blades 60 according to the present invention use the protrusions 64 instead of spacers to maintain a constant blade interval, these blades 60 are not prone to the friction resistance between the blade side surfaces, and may stably make a plurality of incisions simultaneously. As a result, the cross-cut test device is capable of stably making incisions in a right angle lattice pattern with a small biasing force through a coating film applied on resin film substrates even with 50 μm or less thickness. A spacer 80 shown in FIG. 4 has a comparable thickness with that of the semi-cylindrical protrusions 64 and is used to adjust the gap and the friction resistance between the side surface of the blade 60 with no semi-cylindrical protrusions 64 and the blade holder 20. Conventional cross-cut methods use specified (e.g., by JIS "K-5400") blades (cutting edge angle of about 22°) with 0.38 mm thickness which are commercially available. Generally, the conventional cross-cut methods specified the incision interval by interposing spaces between blades. The above method was subject to variability of the incision depth when, for example, the substrate of the coating film was made of resin or the like and the biasing force applied to one blade to make incisions needed to be as small as about 0.3 N, causing the effect of the friction force between the spacers and the blades to increase relatively large compared to the force applied to the blades.

Figure 7:
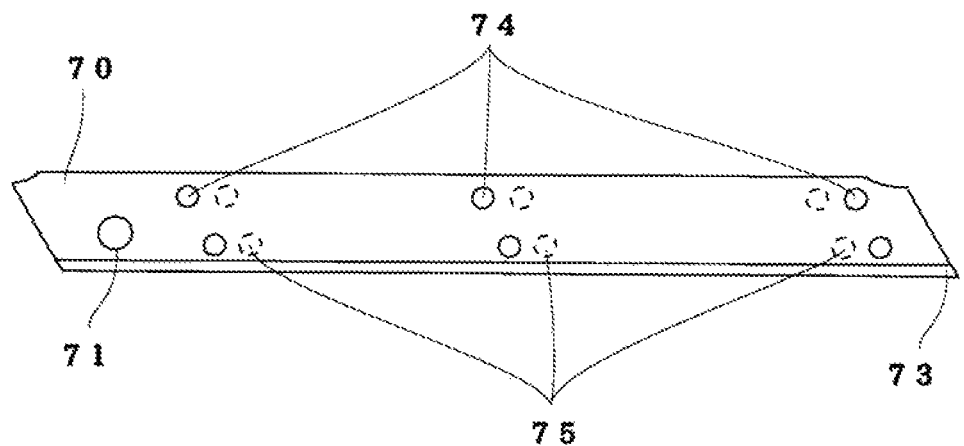
FIG. 7 is a exploded perspective view showing an example of a blade, each comprising protrusions on both of its side surfaces according to the present invention.
Figure 8:
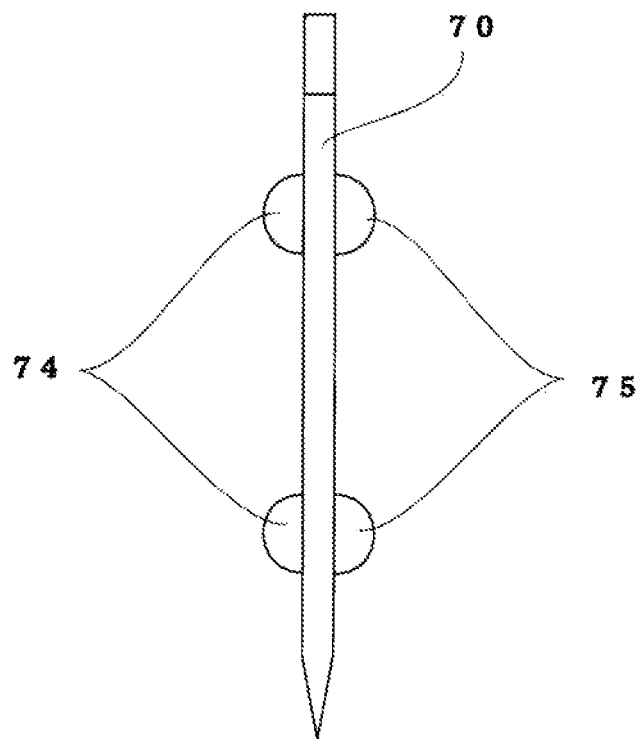
FIG. 8 is a front view of the blade shown in FIG. 7.

According to the present invention, the blades comprises the protrusions at least on one of its side surfaces and may maintain a constant blade interval when pivotably mounted on the fulcrum shaft of the blade holder, wherein the protrusion shape and material are not particularly limited as long as they do not interfere with the blade movements needed for the cross cuts. Examples of preferred shapes of the blade protrusion include a semi-cylindrical protrusion, a hemispherical protrusion, combination thereof and the like with a small friction resistance with the blade side surface. FIG. 7 is a transparent side view showing an example of a blade 70 comprising hemispherical protrusions 74 on both side surfaces; and FIG. 8 is a front view of FIG. 7. The hemispherical protrusions 74, 75 of the blade 70 are formed asymmetrically on the side surfaces of the blade 70 to avoid interference with movement of the blade 70 in the rotational direction about the fulcrum shaft 25. Examples of preferred materials for the blade protrusions according to the present invention include non-magnetic materials which do not damage the blade side surfaces and have small friction resistance with the magnetized blade side surfaces, and particularly, resins such as fluoroplastics and polyolefin resins, non-magnetic metals such as aluminum and the like. Preferably, the thickness of the protrusions according to the present invention is 80-95% of the gap between the blades. Within this range, the incision interval may be controlled with an error less than 0.2 mm. Preferably, the thickness of the semi-cylindrical protrusions 64 or the hemispherical protrusions 74, 75 is 0.5-0.6 mm. Due to its effect on the precision of the incision interval on the coating films, the thickness variability of the protrusions according to the present invention is preferably 0.05 mm or less. Methods for manufacturing the blades with the protrusions include a method for affixing the protrusion-shaped parts on the blade side surfaces using adhesive; a method for forming the protrusions by directly depositing molten resin or metal on the blade side surfaces preprocessed for easy adhesion; and the like. The conventional cross-cut test methods using blades inserted between spacers require careful and tedious attention when exchanging the blades by inserting a replacement blade into a very narrow gap of 1 mm or less without damaging the blade tip. When the blade tips 63 are damaged or worn out, the blades 60 may be easily exchanged by removing the fulcrum shaft 25. Further, when a plurality of the blades 70 are held together in parallel, the hemispherical protrusions 74, 75 prevent the bundle of blades 70 from falling apart.

In FIG. 4, FIG. 5, FIG. 6 and FIG. 9, the blade holder 20 is provided with two pairs of magnet rollers 31, 32 at the tip part of the blade holder 20. The magnet rollers 31, 32 are placed so as to surround blade tips 63 pulled out by the magnetic force. The magnet rollers 31, 32 are preferably arranged so that the angle between the coating film surface to be tested and the blade holder 20 is 25-35° when the magnet rollers 31, 32 come into contact with the coating film surface. In the cross-cut method using the cross-cut test device shown in FIG. 4, the four wheels of the magnet rollers 31, 32 are placed on and in contact with the coating film with the blades 60 fixed by blade stopper 50. Next, the blade stopper 50 is slowly rotated to release the fixed blades 10, and then, the blade tips 13 will come into contact with the coating film. Then, the two pairs of magnet rollers 31, 32 may move the contact points with the coating film relative to the coating film while preventing the blade tips 13 from leaving the coating film surface to thereby make eleven incisions simultaneously through the coating film while maintaining a constant blade angle. When the substrate of the coating film is made of a soft magnetic material, two pairs of magnet rollers are pulled to the coating film surface to allow the cross-cut device to become standalone, facilitating the cross cut. Also, when the coating film is made of a non-magnetic material, a similar effect to the case of the substrate made of a soft magnetic material may be achieved by providing a soft magnetic material on the opposite side of the coating film. The attractive force between the coating film and the magnet rollers is preferably stronger than the attractive force between the plurality of blades and the magnet for biasing the blades, and, for example, neodymium magnets are preferably used for the magnet rollers. With the two pairs of magnet rollers 31, 32 attach to the coating film with a stronger attractive force than that between the plurality of blades and the blade-biasing magnet, the two pairs of magnet rollers 31, 32 may make incisions without being separated from the substrate while maintaining a constant angle between the blades 60 and the coating film. If necessary, arc magnets 35 may be provided on both sides of each of the magnet rollers 31, 32. With the arc magnets 35, magnetic field lines of the magnet rollers 31 are focused in the direction towards the coating film to achieve stronger attractive force.

Figure 9:
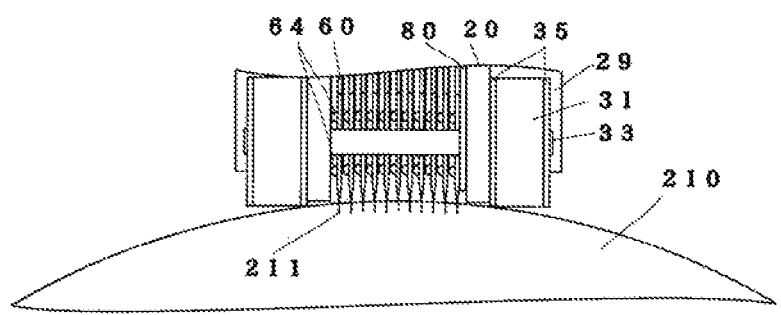
FIG. 9 is an enlarged front view of the cross-cut test device of FIG. 4 making incisions into a spherical coating film to be tested.

FIG. 9 is an enlarged front view showing the cross-cut test device of FIG. 4 making eleven incisions 211 into a coating film 210 of a spherical test sample. In a method of cross-cutting through the coating film to be tested 210, the inner arc magnets 35 of the left and right magnet rollers 31 are brought into contact with a coating film 210 with the blades 60 fixed inside the blade holder 20, and subsequently the blade stopper 50 is rotated to release the blades from the fixed state to thereby bring all of the eleven blades into contact with the coating film independently. By moving the cross-cut device backward along the surface of the coating film 210, the eleven incisions 211 are made. The coating film 210 is then rotated by 90° and a similar operation is performed perpendicular to the eleven incisions 211 previously made, generating 100 cells in the incision lattice. When the blade tips 63 of the eleven blades 60 are in contact with the convex spherical shape, the distance between each of the cutting edge 62 and the biasing magnet 30 is larger for the blades 60 closer to the center. Since the magnetic attractive force of is inversely proportional to the square of the distance, the effect of the curved surface of the coating film may be reduced to thereby improve the cross-cut test accuracy by positioning the magnet 30 away from cutting edges 62 by 1 mm or more and even closer to the fulcrum shaft 25.

Figure 10:
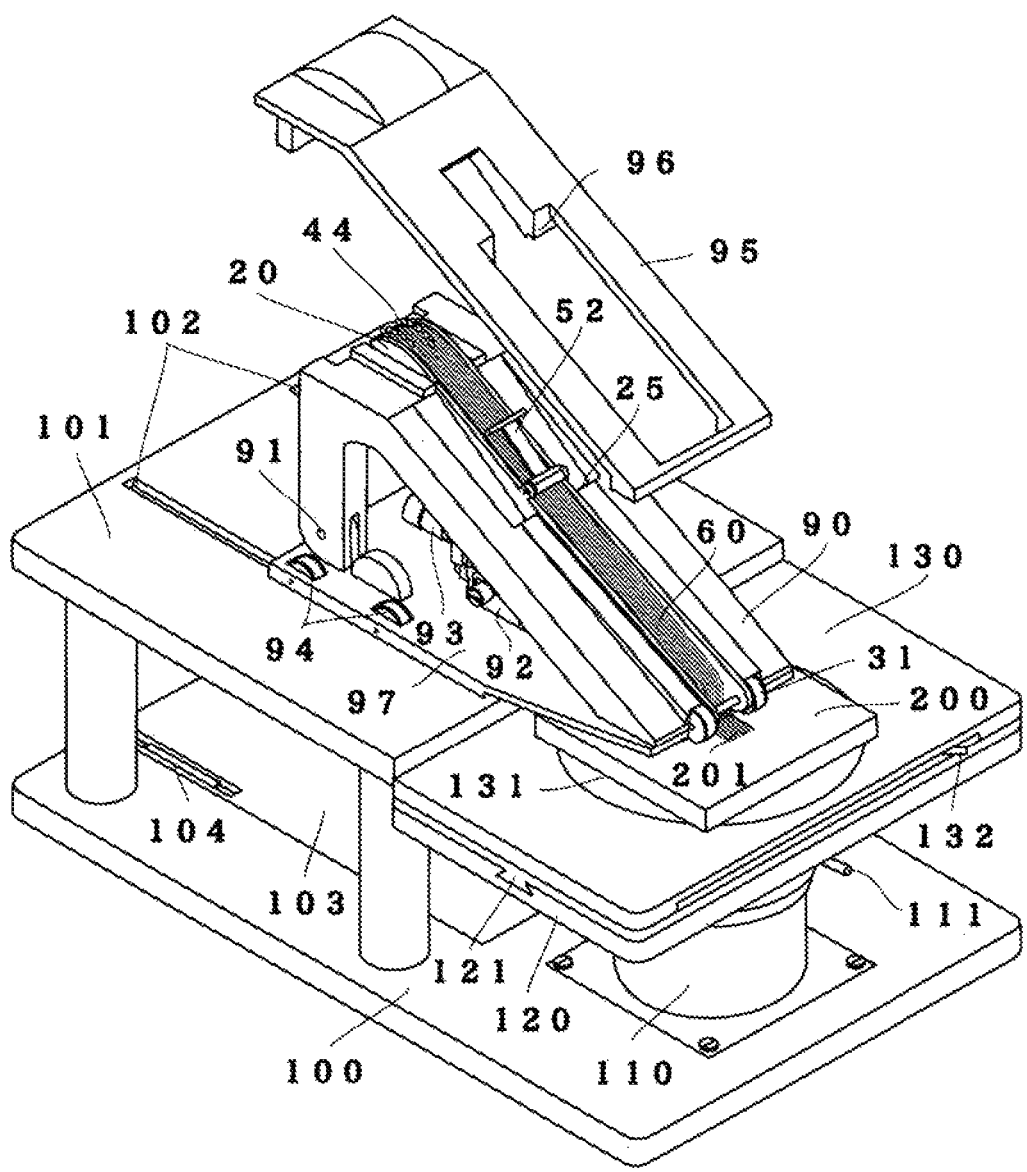
FIG. 10 is a perspective view showing an example application of the cross-cut test device of FIG. 4.
Figure 11:
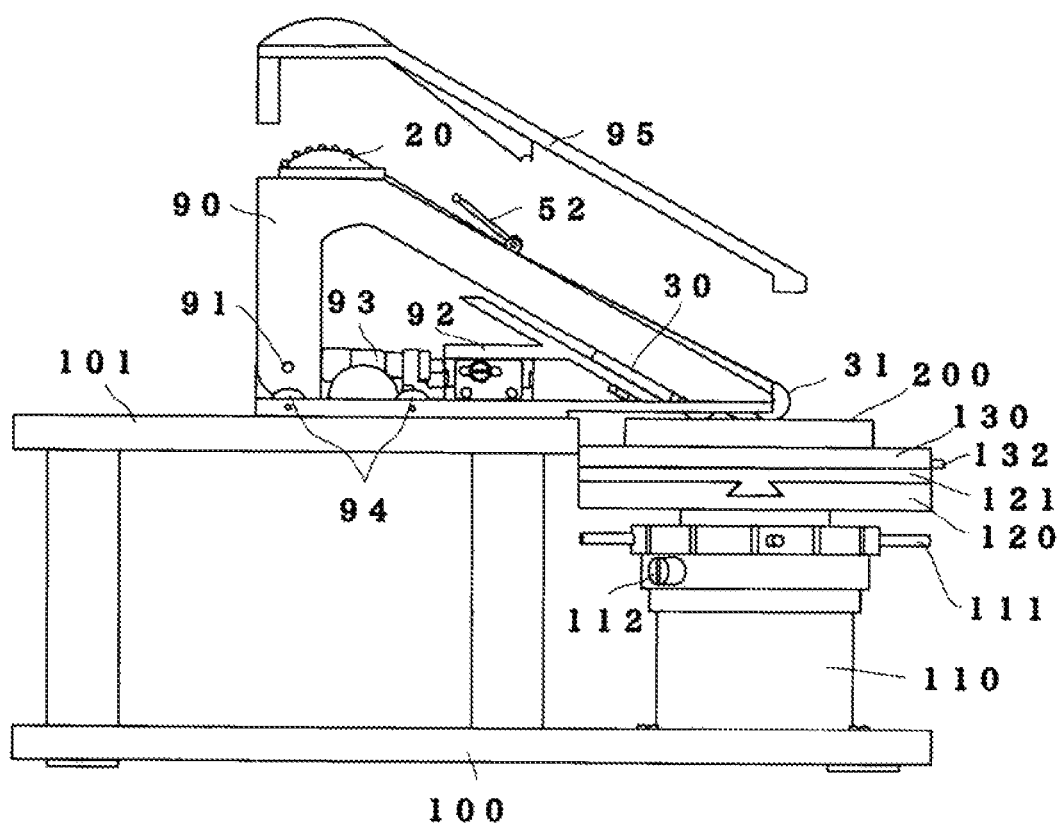
FIG. 11 is a side view of the cross-cut test device shown in FIG. 10.

FIG. 10 is a perspective view showing one example of a vehicle-shaped cross-cut test device and a test stand as an example application of the cross-cut test device of the present invention, and this figure shows the vehicle-shaped cross-cut test device making incisions through a coating film being tested. As a basic configuration, the vehicle-shaped cross-cut test device comprises a blade holder 20, blades 60 comprising protrusions on their respective side surfaces, pickup plates 40, a blade stopper 52 and magnet rollers 31, 32 as well as a bottom plate 97, a horizontal movable stage 92, a frame 90, four magnet rollers 94 and a cover 95. Instead of being housed in the magnet cover 29, the magnet 30 is fixed to the horizontal movable stage 92 at an arbitrary height and its distance from the blades is precisely adjusted with a micrometer 93. The fulcrum shaft 25 is supported by an engaging portion of the frame 90 at a position where the angle between the blades 60 and the bottom plate 97 is 25-35°, and is fixed by an engaging portion 96 of the cover 95. The frame 90 is pivotably mounted on an engagement shaft 91 at the rear end of the bottom plate 97 using a mechanism allowing the frame 90 to be retained at any angle. The four magnet rollers 94 projectingly provided in the rear bottom surface of the bottom plate 97 may rotate while being attached to a magnetic material. Accordingly, when making incisions through a coating film above a soft magnetic material, simply pulling the vehicle-shaped cross-cut test device horizontally and rearwardly may stably generate incisions while maintaining a constant cutting edge angle. According to the characteristics described hereinabove, the vehicle-shaped cross-cut test device is suited for testing planar coating films.

The test stand 100 shown in FIG. 10 is mainly constructed of a rail stand 101, a movable sample stand 130 and a storage section 103. The rail stand 101 is provided with recessed rails 102 which engage with the magnet rollers 94. As for the rail stand 101 material, at least the bottom surface section of each of the recessed rails 102 is made of a magnetic material, and also the overall rail stand 101 may be constructed with a magnetic material. When the bottom surface sections of the recessed rails 102 are made of a hard magnetic material, the surfaces which contact with the magnet rollers 94 are disposed so that the surfaces and the magnet rollers 94 pull each other.

The movable sample stand 130 shown in FIG. 10 is provided with dovetail slide stages 120, 121 and a turntable 131 on a helicoid lifting stage 110. The helicoid lifting stage 110 is provided with a lifting lever 111 and a setscrew 112 and adjusted with the lifting lever 111 so that a coating film surface 200 of a test sample and the rail stand 101 are at the same height. A female dovetail slide stage 120 is fixed on upper surface of the helicoid lifting stage 110 of the dovetail slide stage 120, 121. A male dovetail slide stage 121 is layered on top of the female dovetail slide stage 120 and is movable in the direction orthogonal to the moving direction of the cross-cut test device. The dovetail slide stages 120, 121 are useful when making a plurality of incisions in a right angle lattice pattern. A non-turning portion surrounding the turntable 131 is fixed to the male dovetail slide stage 121 and the turntable 131 may be rotated by 90° using a turntable lever 132.

Next, a cross-cut method using the vehicle-shaped cross-cut test device and the movable sample stand 130 shown in FIG. 10 will be described. The test sample comprising the coating film surface 200 is fixed to the turntable 131 of the movable sample stand 130 and an adjustment is made using the lifting lever 111 so that the coating film surface 200 and the helicoid lifting stage 110 are at the same height. In methods for fixing the test sample, a removable adhesive tape, a toggle clamp or the like may be used, or an operator may hold down the test sample. When the test sample is heavy or when a plurality of identically-shaped test samples are tested, the height of the movable sample stand 130 may be fixed using the setscrew 112. In the vehicle-shaped cross-cut test device, after the blade stopper 52 (changeable with the blade stopper 50 shown in FIG. 4) is turned in the direction towards the cutting edge, the blades 60 are moved to a cross-cut starting position while being fixed and the blade stopper is slowly turned to allow the blade tips 63 to come into contact with the coating film to be tested 200. Then, while pushing down the bottom plate 97, the vehicle-shaped cross-cut test device is pulled rearwardly over a required length to thereby make eleven incisions. After fixing the blades 60 using the blade stopper 52 and rotating the test sample by 90° using the turntable lever 132, a similar cutting operation is performed so that the new incisions intersect with the previously made incisions by 90° angle to thereby generate incisions in a right angle lattice pattern 201.

FIG. 12 is a side view of the vehicle-shaped cross-cut test device stowed in the test stand. The test stand shown in FIG. 10 is provided with a retaining section 104 for fixing the magnet rollers in the storage section 103, and the retaining section 104 comprises an attractive section consisting of recesses and a magnetic material for engaging with the magnet rollers to thereby store the vehicle-shaped cross-cut test device safely by preventing it from moving out of the storage section 103.

EMBODIMENT EXAMPLE 1

Figure 13:
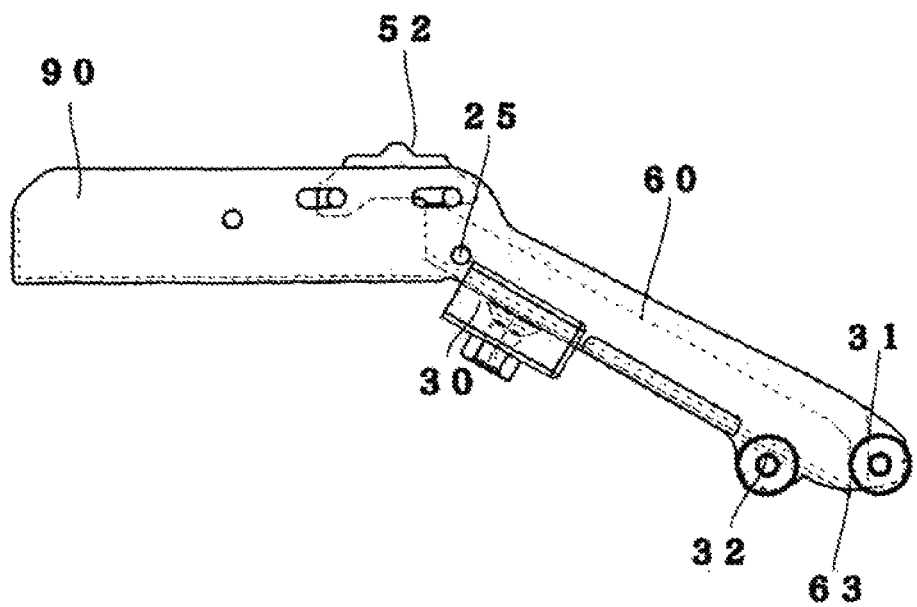
FIG. 13 is a transparent side view showing an implementation method of a cross-cut test device.

FIG. 13 is a transparent side view showing an embodiment example 1 of a cross-cut test device of the present invention. The reference numerals 25, 30, 31, 32 are analogous to the same reference numerals in FIG. 4. The sliding-style blade stopper 52 is slidably mounted on a holder 90. By sliding the blade stopper 52 away from the blade tips 63, the blade tips 63 may be lifted. Each of the blades 60 is a snap-off blade with 0.38 mm thickness with spacers made of the ABS resin (with 0.5 mm thickness and 1 mm width) attached on the blade at similar positions to ones of the spacers 64 of FIG. 4 using a resin adhesive.

Figure 14:
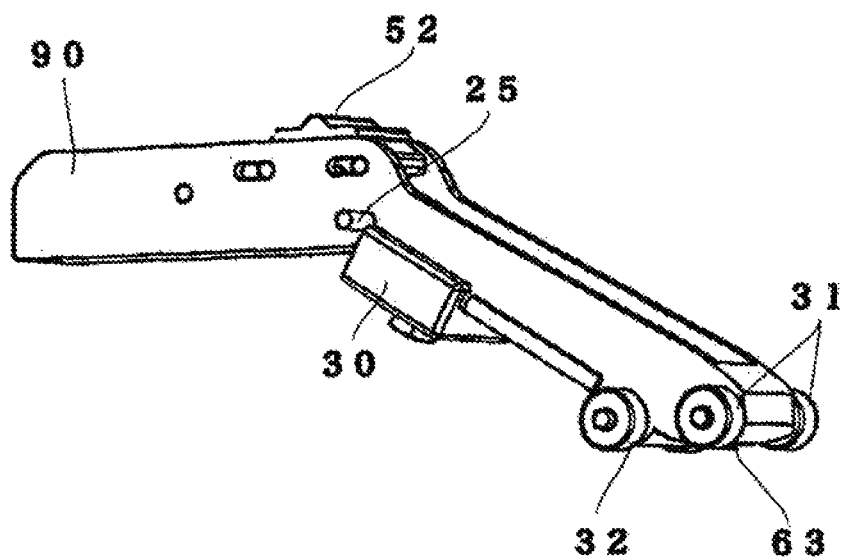
FIG. 14 is a perspective view showing the implementation method of the cross-cut test device.

FIG. 14 is a perspective view of FIG. 13.

Using the cross-cut test device of the embodiment example 1, eleven incisions were made simultaneously, easily and stably through the printed film on a side surface (curved surface) of a steel beverage can with 50 mm cross-sectional diameter. Also, eleven incisions were made simultaneously, easily and stably through the printed film on a food packaging resin film with about 20 μm thickness without severing the base film.

What is claimed is:

1. A cross-cut device, comprising: a plurality of blades respectively having an engagement hole; a fulcrum shaft for pivotably mounting thereon the blades parallel to each other and arranged in a blade thickness direction; and a blade holder for housing the blades pivotably mounted on the fulcrum shaft, wherein a magnet is interposed between cutting edges of the blades and a coating film to be tested, and wherein the blades are pulled in the direction toward the cutting edges by a magnetic force of the magnet.

2. The cross-cut test device of claim 1, wherein the blades each comprises a protrusion at least on one of side surfaces of the blade, wherein the protrusion has a thickness according to an incision interval.

3. The cross-cut test device of claim 1, further comprising: a magnet roller for biasing the coating film to be tested.

4. A cross-cut method for making a plurality of incisions through a coating film to be tested, said method comprising:
pivotably mounting a plurality of blades each with an engagement hole so that the plurality of blades are parallel to each other and arranged in a blade thickness direction inside a blade holder; and
by an attractive force of a magnet interposed between cutting edges of the blades and the coating film, pulling each blade tip of the respective blades out of the blade holder, pushing the blade tips against the coating film, and moving the contact points between the blade tips and the coating film relative to the coating film.

* * * * *